United States Patent
Fisher et al.

(10) Patent No.: US 9,859,572 B2
(45) Date of Patent: Jan. 2, 2018

(54) GAS DIFFUSION SUBSTRATE

(71) Applicant: Technical Fibre Products Limited, Cumbria (GB)

(72) Inventors: Rosemary Fisher, Cumbria (GB); Ian Roy Harkness, Oxford (GB); Jonathan David Brereton Sharman, Reading (GB); Michael Jeschke, Cumbria (GB)

(73) Assignee: Technical Fibre Products Limited, Cumbria (GB)

( * ) Notice: Subject to any disclaimer, the term of this patent is extended or adjusted under 35 U.S.C. 154(b) by 31 days.

(21) Appl. No.: 14/350,184

(22) PCT Filed: Oct. 17, 2012

(86) PCT No.: PCT/GB2012/052560
§ 371 (c)(1),
(2) Date: Apr. 7, 2014

(87) PCT Pub. No.: WO2013/057483
PCT Pub. Date: Apr. 25, 2013

(65) Prior Publication Data
US 2014/0255819 A1 Sep. 11, 2014

(30) Foreign Application Priority Data
Oct. 19, 2011 (GB) .................................. 1118020.5

(51) Int. Cl.
*H01M 8/02* (2016.01)
*H01M 8/0243* (2016.01)
(Continued)

(52) U.S. Cl.
CPC ....... *H01M 8/0243* (2013.01); *H01M 4/8605* (2013.01); *H01M 4/8642* (2013.01);
(Continued)

(58) Field of Classification Search
CPC ............. H01M 8/0243; H01M 8/0234; H01M 8/1007; H01M 4/8652; H01M 4/8642; H01M 4/8673; H01M 2008/1095
See application file for complete search history.

(56) References Cited

U.S. PATENT DOCUMENTS

| 5,865,968 A | 2/1999 | Denton et al. |
| 6,010,606 A | 1/2000 | Denton et al. |

(Continued)

FOREIGN PATENT DOCUMENTS

| EP | 0 791 974 | 8/1997 |
| EP | 0 875 524 | 11/1998 |

(Continued)

OTHER PUBLICATIONS

International Search Report dated Nov. 30, 2012, corresponding to PCT/GB2012/052560.
(Continued)

*Primary Examiner* — Ula C Ruddock
*Assistant Examiner* — Matthew Van Oudenaren
(74) *Attorney, Agent, or Firm* — Baker & Hostetler LLP

(57) ABSTRACT

A non-woven gas diffusion substrate including: (i) a non-woven carbon fiber web; (ii) a carbon particulate material; and 10 (iii) a hydrophobic binder characterized in that the non-woven gas diffusion substrate further includes a conductive material having a x:y aspect ratio from 0.01 to 100, a x:z aspect ratio of at least 500 and a y:z aspect ratio of at least 500.

15 Claims, 2 Drawing Sheets

(51) Int. Cl.
  *H01M 4/86*    (2006.01)
  *H01M 8/0234*  (2016.01)
  *H01M 8/1007*  (2016.01)
  *H01M 8/1018*  (2016.01)

(52) U.S. Cl.
  CPC ....... *H01M 4/8652* (2013.01); *H01M 4/8673* (2013.01); *H01M 8/0234* (2013.01); *H01M 8/1007* (2016.02); *H01M 2008/1095* (2013.01)

(56) References Cited

U.S. PATENT DOCUMENTS

| | | | |
|---|---|---|---|
| 6,042,958 A | 3/2000 | Denton et al. | |
| 6,677,073 B1 | 1/2004 | Brown et al. | |
| 2003/0165740 A1 | 9/2003 | Edwards et al. | |
| 2004/0058123 A1 | 3/2004 | Cooper et al. | |
| 2005/0130023 A1 | 6/2005 | Lebowitz et al. | |
| 2007/0212538 A1 | 9/2007 | Niu | |
| 2008/0220282 A1* | 9/2008 | Jang | B32B 15/08 428/689 |
| 2009/0155578 A1* | 6/2009 | Zhamu | B82Y 30/00 428/336 |
| 2012/0045710 A1* | 2/2012 | Jeschke | H01M 4/8605 429/480 |

FOREIGN PATENT DOCUMENTS

| | | |
|---|---|---|
| EP | 1 063 716 | 12/2000 |
| JP | H09-326256 A | 12/1997 |
| JP | 2002-280004 A | 9/2002 |
| JP | 2002-536565 A | 10/2002 |
| JP | 2004-514246 A | 5/2004 |
| JP | 2006-32163 A | 2/2006 |
| JP | 2008-503043 A | 1/2008 |
| JP | 2009-525576 A | 7/2009 |
| WO | 00/47816 | 8/2000 |
| WO | 00/47816 A1 | 8/2000 |
| WO | 01/80342 | 10/2001 |
| WO | 02/39526 | 5/2002 |
| WO | 2005/020356 | 3/2005 |
| WO | 2005/124902 | 12/2005 |
| WO | 2005/124902 A1 | 12/2005 |
| WO | 2007/088396 | 8/2007 |
| WO | 2007/088396 A1 | 8/2007 |
| WO | 2010/092370 | 8/2010 |
| WO | WO2010092370 | * 8/2010 |

OTHER PUBLICATIONS

British Search Report dated Nov. 29, 2011, corresponding to the Foreign Priority Application No. GB 1118020.5.

S. Stankovich, et al.; "Graphene-Based Composite Materials"; vol. 442, Jul. 20, 2006; pp. 282-286.

W. Chen, et al.; "Preparation of Graphene by the Rapid and Mild Thermal Reduction of Graphene Oxide Induced by Microwaves"; vol. 48, No. 4; Apr. 1, 2010; pp. 1146-1152.

Japanese Office Action, dated May 31, 2016, from corresponding Japanese Application No. 2014-536324.

* cited by examiner

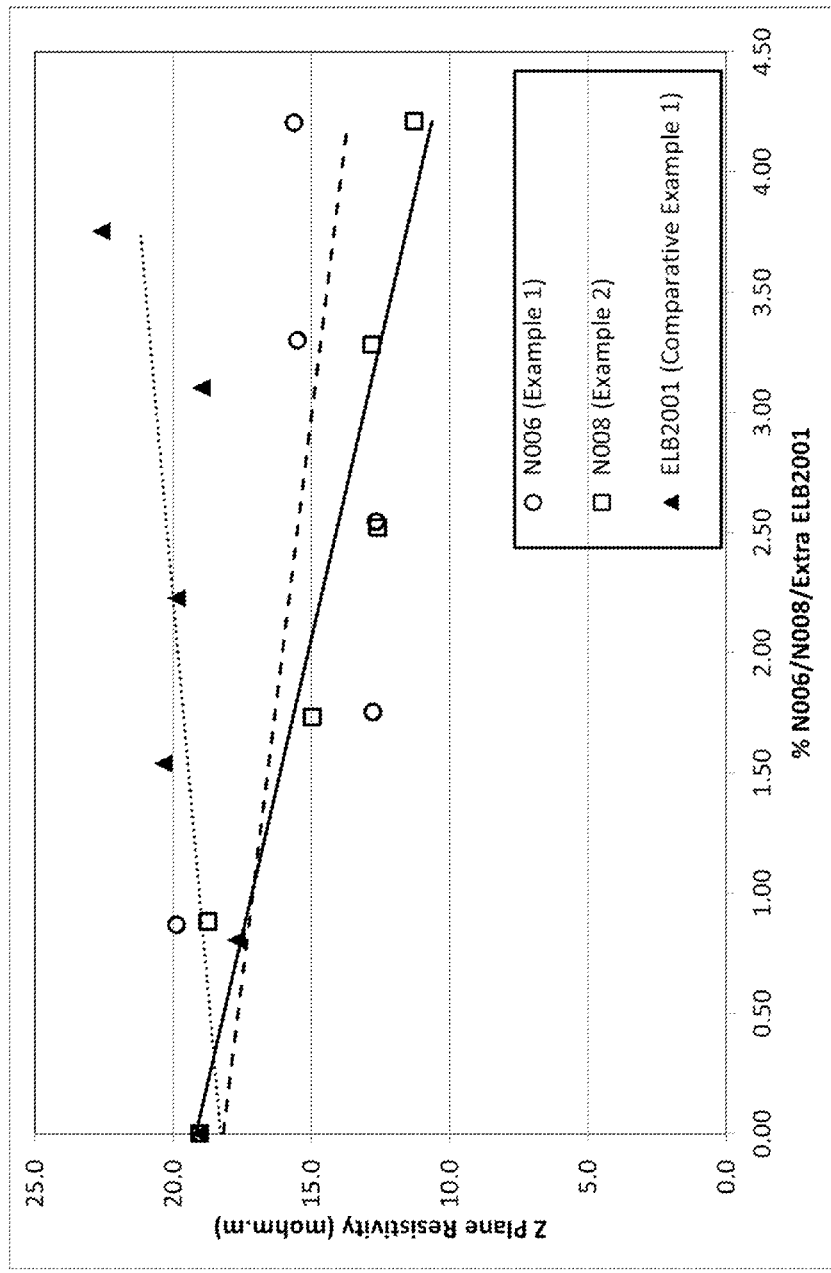
Figure 1: Graph showing through-plane electrical resistivity vs. wt% of N008, N006 and extra ELB2001 added

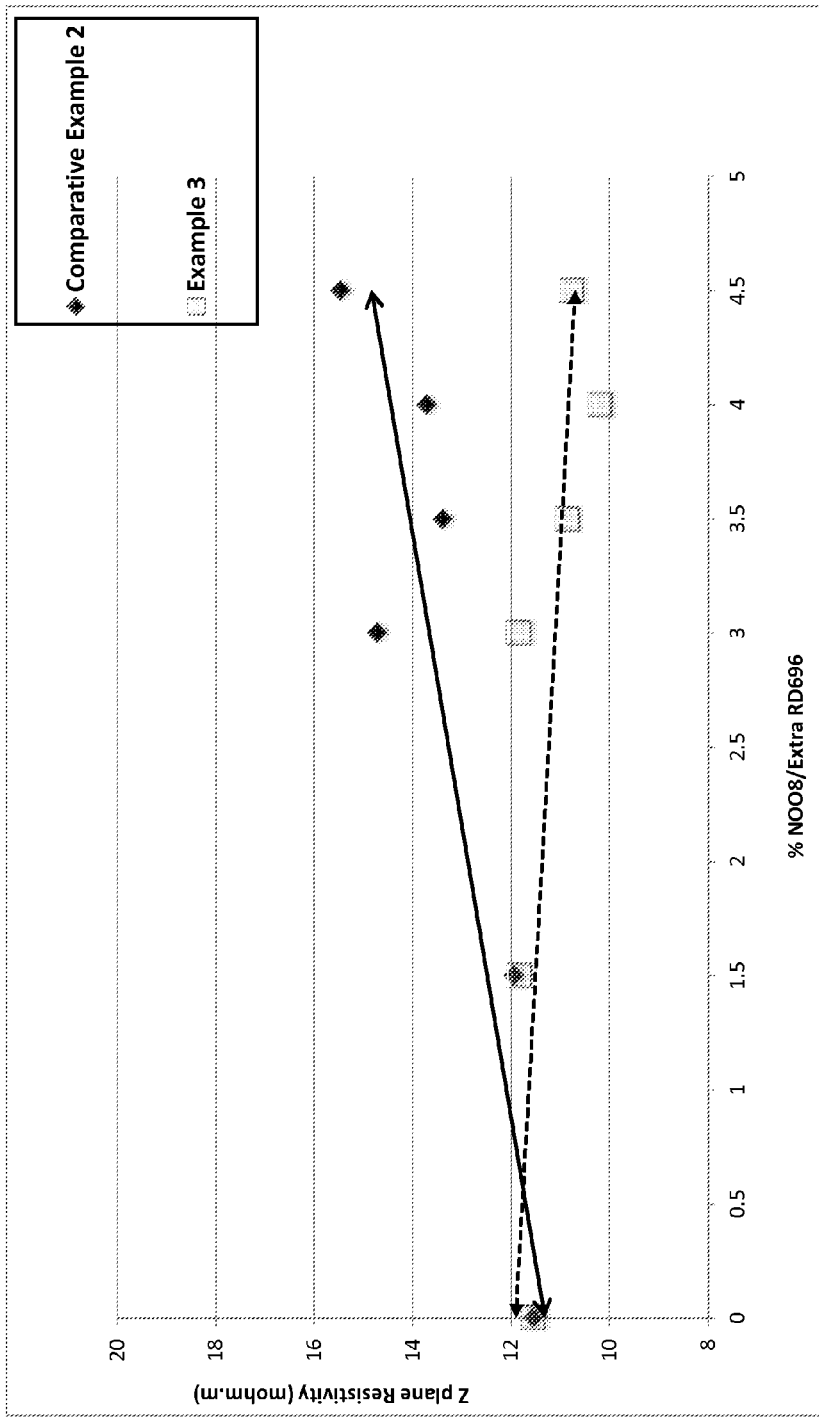
Figure 2: Graph showing through-plane electrical resistivity vs. wt% of N008, and extra RD696 added

GAS DIFFUSION SUBSTRATE

BACKGROUND OF THE INVENTION

Field of the Invention

The present invention relates to a non-woven gas diffusion substrate, particularly to a non-woven gas diffusion substrate for use in a fuel cell, such as a proton exchange membrane fuel cell.

Description of the Related Art

A fuel cell is an electrochemical cell comprising two electrodes separated by an electrolyte. A fuel, such as hydrogen or a hydrocarbon such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In the hydrogen or hydrocarbon-fuelled proton exchange membrane fuel cell (PEMFC) the electrolyte is a solid polymeric membrane which is electronically insulating and proton conducting. Protons produced at the anode, are transported across the membrane to the cathode, where they combine with oxygen to form water.

The principal component of a PEMFC is known as a membrane electrode assembly (MEA) and is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

The MEA can be constructed by several methods. The electrocatalyst layer may be applied to the gas diffusion layer to form a gas diffusion electrode. Two gas diffusion electrodes can be placed either side of an ion-conducting membrane and laminated together to form the five-layer MEA. Alternatively, the electrocatalyst layer may be applied to both faces of the ion-conducting membrane to form a catalyst coated ion-conducting membrane. Subsequently, gas diffusion layers are applied to both faces of the catalyst coated ion-conducting membrane. Finally, an MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs, removing products, providing electrical connections and providing physical support.

Typically, the gas diffusion layers are formed from gas diffusion substrates having a layer of particulate material (a microporous or base layer), such as carbon black and PTFE, on one face of the gas diffusion substrate, such that when formed into a MEA, the microporous layer contacts the electrocatalyst layer.

It is an essential requirement of a gas diffusion substrate that it is electrically conductive. Substrates are usually made from carbonised polyacrylonitrile (PAN) fibres. The gas diffusion substrates most widely commercialised and used to date are made from these fibres by using wet-laid or dry-laid processes to produce a non-woven web of carbon fibres. The non-woven webs are then generally impregnated with an organic resin binder material (e.g. a phenolic resin) that is capable of being carbonised or graphitised when heat treated to a high temperature. Once impregnated, the web is subjected to a heat-treatment process, requiring heating to temperatures of up to 2000° C., or for some products, in excess of 2000° C., to transform the organic material into a carbonaceous conductive residue. The residue acts as a binder to provide mechanical strength to the carbon fibre web. The common feature of all the established commercially available non-woven substrates is that they are manufactured using very high temperature heat treatment process steps on the carbon fibre webs, to confer the required conductivity, stability and mechanical strength properties. However, these processes are extremely energy intensive and contribute significantly to the cost of these substrates. Alternatively, substrates comprising non-woven carbon fibre webs comprising carbonaceous particles and a carbonised or graphitised residue from a carbonisable or graphitisable binder can be used, e.g. those substrates disclosed in U.S. Pat. No. 7,144,476. These still require a high-temperature treatment from 800° C. up to 2500° C. depending on whether the binder is to be carbonised or graphitised. Alternatively, woven carbon cloth substrates can also be made from weaving PAN fibres followed by carbonisation of the cloth at up to 1700° C. to produce a woven carbon fibre cloth substrate. Carbon cloth substrates do not use an organic resin binder in their manufacture as their woven structure provides the required mechanical integrity. However, because of their woven nature, these substrates are more difficult to handle in subsequent processes to form the complete MEA, and are susceptible to deformation under the compressive loads applied when incorporated into a fuel cell stack, which can limit the fuel cell performance attainable. This has thus limited the widespread application of the woven carbon cloth substrates, and the non-woven substrates remain the most widely employed materials. Therefore, there remains a need for a non-woven substrate that does not require the costly high temperature carbonisation or graphitisation treatment steps on the carbon web, but that attains the essential characteristic of high electrical conductivity.

Previously, the inventors have sought to provide a substrate that has good conductivity, but that does not require a high temperature carbonisation or graphitisation step. EP0791974 discloses a continuous manufacturing method for preparing gas diffusion substrates that does not use a high temperature carbonisation or graphitisation step. Carbon black is mixed with PTFE, and carbon fibres are coated with PTFE. The carbon black/PTFE mixture and the coated carbon fibres are mixed to form a slurry which is deposited onto a moving mesh bed. The deposited layer is dried and fired in air at a temperature in excess of 350° C. to sinter the PTFE, forming a gas diffusion substrate. Furthermore, WO2005/124902 discloses a gas diffusion substrate comprising a non-woven network of carbon fibres wherein the carbon fibres are graphitised, but the non-woven network has not been subjected to a graphitisation process; and a mixture of graphitic particles and hydrophobic polymer disposed within the network, wherein the longest dimension of at least 90% of the graphitic particles is less than 100 μm.

However, the conductivities achieved by such gas diffusion substrates are still not sufficient for widespread commercialisation in all applications. Thus, the present inventors have sought to provide a gas diffusion substrate that has sufficient electrical conductivity to be commercially viable, but which does not require the costly high temperature heat treatment step.

SUMMARY OF THE INVENTION

Accordingly the present invention provides a non-woven gas diffusion substrate comprising:
(i) a non-woven carbon fibre web;
(ii) a carbon particulate material; and
(iii) a hydrophobic binder
characterised in that the non-woven gas diffusion substrate further comprises a conductive material having a x:y aspect ratio from 0.01 to 100, a x:z aspect ratio of at least 500 and a y:z aspect ratio of at least 500. The non-woven gas diffusion substrate of the invention has not been heat treated above 400° C. and does not contain a carbonaceous/graphitised residue of an organic resin binder material (e.g. phenolic resin).

BRIEF DESCRIPTION OF THE DRAWING FIGURES

FIG. 1 shows the reduction in the resistivity of Examples 1 and 2 compared to Comparative Example 1.

FIG. 2 shows the reduction in the resistivity of Example 3 compared to Comparative Example 2.

DETAILED DESCRIPTION OF THE INVENTION

The conductive material is a wafer-like structure having an x dimension of from 0.5 to 500 μm, preferably from 1 to 100 μm, and a y-dimension of from 0.5 to 500 μm, preferably from 1 to 100 μm.

Preferably, the conductive material is a carbon-based material (often referred to as nanographene platelets or graphene nanoplatelets, such as the N002, N006 and N008 series from Angstron Materials, Inc., xGnP® from XG Sciences, Inc., or US1059 from US Research Nanomaterials, Inc.) or a metal or conductive metal oxide, nitride or carbide (e.g. doped $TiO_x$ or doped $SnO_x$) having the required x:y, x:z and y:z aspect ratios; suitably, the conductive material is a carbon-based material or a metal oxide; preferably a carbon-based material.

It has been found by the present inventors, that even a small addition of such a wafer-like conductive material to the non-woven gas diffusion substrate has a significant impact on the electrical conductivity when compared to the addition of extra conventional carbon particulate material. Thus, in a preferred aspect of the present invention, the conductive material is present in the non-woven gas diffusion substrate in an amount of from 0.75 wt % based on the total weight of the final non-woven gas diffusion substrate, preferably from 1.25 wt %. Preferably, the conductive material is present in the non-woven gas diffusion substrate in a maximum amount of 10 wt % as a weight percent of the non-woven gas diffusion substrate, more preferably in a maximum of 5 wt %.

The non-woven carbon fibre web from which the substrate is prepared suitably comprises carbon fibres (for example those derived from polyacrylonitrile (PAN) fibres (such as SIGRAFIL® C grades from SGL Group, Panex grades (e.g. Panex 35) from Zoltek)), pitch fibres (such as Dialead K223HE from Sumitomo, Thornel® Continuous Pitch-based carbon fibres and Thermalgraph® fibres both from Cytec Industries Inc.), rayon fibres or fibres derived from any other polymer precursor, activated carbon fibres (such as KOTHmex ACF from Taiwan Carbon Technology Co. Ltd and ACF 1603-15 and 1603-20 from Kynol Europa GmbH), carbon nanofibres, pitch based foam fibres or a mixture of one or more thereof. Suitably, the non-woven carbon fibre web comprises carbon fibres or carbon nanofibres or mixtures thereof.

The fibres from which the non-woven carbon fibre web is prepared suitably have a diameter of 5 nm to 12 μm; if the fibres are nanofibres, suitably the diameter is from 5 nm to 1 μm, preferably 50-500 nm; for all other fibres, suitably, the diameter is from 1 μm to 12 μm, preferably 5 μm to 9 μm.

The fibre length of the fibres from which the non-woven carbon fibre web is prepared will depend on the type of fibres being used. For nanofibres, the length is suitably from 10 nm to 10 μm, preferably from 100 nm to 1000 nm; for all other types of fibres, the length is suitably from 2 mm to 100 mm, more suitably 3 mm to 50 mm, more suitably 3 mm to 25 mm, preferably 6 mm to 18 mm and most preferably 6 mm to 12 mm. Fibres of two or more different lengths or type may be used in the same web. The non-woven fibre web suitably has a weight (grammage) of 5-500 $g/m^2$, suitably 10-50 $g/m^2$. For certain uses, a weight of 15-25 $g/m^2$ is suitable.

The non-woven carbon fibre web may be obtained as a pre-formed mat comprising fibres as listed above. Examples of such pre-formed mats include the Optimat® range of products from Technical Fibre Products Ltd or the AFN® Advanced Fiber Nonwovens range of products from Hollingsworth and Vose. Alternatively, the individual fibres may be sourced and a non-woven carbon fibre web prepared by a technique known to those skilled in the art. Such techniques include processes such as wet laid paper making methods, hydro-entanglement or dry deposition processes.

The carbon particulate material includes: (i) carbon blacks (e.g. Vulcan XC72R from Cabot); (ii) graphite (either synthetic or natural) (e.g. such as would be obtained from a dispersion such as Timrex® ELB2001 from Timcal Graphite and Carbon); (iii) a mixture of carbon black and graphite (e.g. such as would be obtained from a dispersion such as Timrex® LB-1016 from Timcal Graphite and Carbon); (iv) nanofibres and nanotubes (e.g. Pyrograf III® Carbon Fiber from Pyrograf Products Inc. or VGCF-H from Showa Denko K.K.) or a mixture thereof.

The hydrophobic binder is suitably a fluoropolymer such as polytetrafluoroethylene (PTFE) or fluorinated ethylene-propylene (FEP), and is preferably FEP. The weight ratio of carbon particulate material to hydrophobic binder is suitably between 80:20 and 20:80, preferably between 70:30 and 50:50.

In one embodiment of the invention there is a gradient in the concentration of the carbon particulate material, hydrophobic binder and conductive material across the thickness of the non-woven carbon fibre web. The expression "gradient in concentration" means that the concentration varies in a monotonic (although not necessarily linear) manner from a first face of the web to the second face. Suitably the amount of carbon particulate material, hydrophobic binder and conductive material at a first face is at least two times, and preferably at least four times the amount of carbon particulate material, hydrophobic binder and conductive material at a second face.

In a further embodiment, the concentration of carbon particulate material, hydrophobic binder and conductive material is non-homogeneous across the thickness of the non-woven carbon fibre web such that the concentration of carbon particulate material, hydrophobic binder and conductive material is higher at the two faces of the non-woven carbon fibre web with a lower concentration of carbon particulate material, hydrophobic binder and conductive material in the centre of the non-woven carbon fibre web. The change in concentration is not necessarily symmetrical and the lower concentration may be closer to one face of the non-woven carbon fibre web than to the other face.

In an alternative embodiment of the invention, the carbon particulate material, hydrophobic binder and conductive material are homogeneously disposed within the fibre network, i.e. there is no gradient in concentration across the thickness of the non-woven fibre web.

In a preferred embodiment of the invention the non-woven gas diffusion substrate is suitable for use in a fuel cell, and thus has an ex-situ thickness of less than 500 µm, and preferably a thickness between 100 and 350 µm. The thickness of the non-woven gas diffusion substrate is likely to decrease when compressed, such as will occur when assembled into a fuel cell stack.

The present invention further provides a process for forming a non-woven gas diffusion substrate according to the invention comprising the steps of:
 a) forming a non-woven carbon fibre web (as hereinbefore described) or taking a pre-formed non-woven carbon fibre web;
 b) preparing a suspension of carbon particulate material, hydrophobic binder and conductive material;
 c) applying the suspension into the non-woven carbon fibre web;
 d) drying and firing the non-woven fibre web at a temperature that does not exceed 400° C.

The non-woven gas diffusion substrate of the invention may be used as an electrode in any electrochemical device requiring a non-woven gas diffusion substrate. Accordingly, a further aspect of the invention provides a gas diffusion electrode comprising a non-woven gas diffusion substrate of the invention and an electrocatalyst layer present on the non-woven gas diffusion substrate. The non-woven gas diffusion substrate may be provided with a further treatment prior to incorporation into a gas diffusion electrode either to make it more wettable (hydrophilic) or more wet-proofed (hydrophobic). The nature of any treatments will depend on the type of fuel cell and the operating conditions that will be used. The non-woven gas diffusion substrate can be made more wettable by incorporation of materials such as carbon blacks via impregnation from liquid suspensions, or can be made more hydrophobic by impregnating the pore structure of the non-woven gas diffusion substrate with a colloidal suspension of a polymer such as polytetrafluoroethylene (PTFE) or polyfluoroethylenepropylene (FEP), followed by drying and heating above the softening point of the polymer. For some applications, such as PEMFC, an additional carbonaceous layer commonly termed a microporous layer or base layer may also be applied before the deposition of the electrocatalyst layer to form, what is often referred to as, a gas diffusion layer. If the non-woven gas diffusion substrate has a gradient in the concentration of carbon particulate material, hydrophobic binder and conductive material across the thickness of the non-woven gas diffusion substrate, then the microporous layer or base layer is suitably present on the face of the non-woven gas diffusion substrate wherein there is a higher concentration of carbon particulate material, hydrophobic binder and conductive material. Accordingly a further aspect of the invention provides a gas diffusion layer comprising a non-woven gas diffusion substrate of the invention and a carbonaceous layer applied to one face of the non-woven gas diffusion substrate. A still further aspect of the invention provides a gas diffusion electrode comprising a gas diffusion layer of the invention and an electrocatalyst layer present on the face of the gas diffusion layer having the carbonaceous layer.

The non-woven gas diffusion substrate of the invention is also suitable for cells where the catalyst layer is deposited on the membrane or other separator, which electrically separates the anode and cathode electrodes.

The electrocatalyst layer comprises an electrocatalyst which may be a finely divided metal powder (metal black), or may be a supported catalyst wherein small metal particles are dispersed on electrically conducting particulate carbon supports. The electrocatalyst metal is suitably selected from
 (i) the platinum group metals (platinum, palladium, rhodium, ruthenium, iridium and osmium),
 (ii) gold or silver,
 (iii) a base metal,
or an alloy or mixture comprising one or more of these metals or their oxides. The preferred electrocatalyst metal is platinum, which may be alloyed with other precious metals, such as ruthenium, or base metals. If the electrocatalyst is a supported catalyst, the loading of metal particles on the carbon support material is suitably in the range 5-90 wt %, preferably 5-75 wt % of the weight of resulting electrocatalyst.

The electrocatalyst layer may suitably comprise other components, such as ion-conducting polymeric material, which is included to improve the ionic conductivity within the layer.

In a preferred embodiment wherein the gas diffusion electrode is a cathode of a fuel cell and wherein there is a gradient of concentration of carbon particulate material, hydrophobic binder and conductive material across the thickness of the non-woven fibre web, the electrocatalyst layer is adjacent to the face of the non-woven gas diffusion substrate wherein there is a higher concentration of carbon particulate material, hydrophobic binder and conductive material. Positioning the most hydrophobic surface of the substrate adjacent to the catalyst layer prevents the catalyst layer from becoming blocked with water during fuel cell operation.

The present invention further provides a membrane electrode assembly comprising a non-woven gas diffusion substrate according to the invention. The membrane electrode assembly comprises a polymer electrolyte membrane interposed between two electrocatalyst layers. Gas diffusion substrates, at least one of which is a non-woven gas diffusion substrate according to the invention, are adjacent to the electrocatalyst layers.

The membrane may be any membrane suitable for use in a PEM fuel cell, for example the membrane may be based on a perfluorinated sulphonic acid material such as Nafion® (DuPont), Flemion® (Asahi Glass) and Aciplex® (Asahi Kasei); these membranes may be used unmodified, or may be modified to improve the high temperature performance, for example by incorporating an additive. Alternatively, the membrane may be based on a sulphonated hydrocarbon membrane such as those available from Polyfuel, JSR Corporation, FuMA-Tech GmbH and others. The membrane may be a composite membrane, containing the proton-conducting material and other materials that confer properties such as mechanical strength. For example, the membrane may comprise a proton-conducting membrane and a matrix of silica fibres, as described in EP 0 875 524 or the membrane may comprise an expanded PTFE substrate. Alternatively, the membrane may be based on polybenzimidazole doped with phosphoric acid and include membranes from developers such as BASF Fuel Cell GmbH, for example the Celtec®-P membrane which will operate in the range 120° C. to 180° C.

The MEA may further comprise components that seal and/or reinforce the edge regions of the MEA for example as described in WO2005/020356. The MEA is assembled by conventional methods known to those skilled in the art.

In a preferred embodiment wherein there is a gradient of concentration of carbon particulate material, hydrophobic binder and conductive material across the thickness of the non-woven fibre web, an electrocatalyst layer in the membrane electrode assembly is adjacent to the face of the non-woven gas diffusion substrate wherein there is a higher concentration of carbon particulate material, hydrophobic binder and conductive material.

Electrochemical devices in which the non-woven gas diffusion substrate, gas diffusion layer, electrode, and MEA of the invention may be used include fuel cells, in particular proton exchange membrane (PEM) fuel cells. The PEM fuel cell could be operating on hydrogen or a hydrogen-rich fuel at the anode or could be fuelled with a hydrocarbon fuel such as methanol. The non-woven gas diffusion substrate, electrode, and MEA of the invention may also be used in fuel cells in which the membranes use charge carriers other than protons, for example $OH^-$ conducting membranes such as those available from Solvay Solexis S.p.A., FuMA-Tech GmbH. The non-woven gas diffusion substrate and electrode of the invention may also be used in other low temperature fuel cells that employ liquid ion conducting electrolytes, such as aqueous acids and alkaline solutions or concentrated phosphoric acid. Other electrochemical devices in which the non-woven gas diffusion substrate, electrode, and MEA of the invention may be used are as the cathode electrode of regenerative fuel cells where the hydrogen evolution and oxygen reduction reactions are both performed, and as the cathode of an electrolyser where hydrogen evolution is performed.

Accordingly, a further aspect of the invention provides a fuel cell, preferably a proton exchange membrane fuel cell, comprising a non-woven gas diffusion substrate, a gas diffusion layer, an electrode, or an MEA of the invention.

The invention will now be described by reference to examples that are illustrative and not limiting of the invention.

EXAMPLE 1

A 20 g/m² A4 sample of carbon fibre web (absolute weight of web=1.25 g) manufactured by Technical Fibre Products was impregnated with 1.22 g of fluorinated ethylene propylene (Dyneon™ FEP6300GZ from 3M), 1.42 g of graphite/carbon black particles (Timrex® LB-1016 from Timcal Graphite & Carbon), 1.42 g of graphite particles (Timrex® E-LB 2001 from Timcal Graphite & Carbon) and varying weights (0.035 g-0.17 g), equating to from 1 to 10 wt % of the total weight of solids (FEP+graphite/carbon+graphite+nanographene platelets) of nanographene platelets (N006-100-05 (N006) from Angstron Materials Inc.). After drying the material at 150-250° C., the substrate was heat treated at 385° C. at a specific ramp rate/cool regime during the treatment. Through-plane electrical resistivity, using a two-electrode configuration, was measured and is given in Table 1, together with the relative amount of nanographene platelets, as a weight percent of the total weight of the substrate.

EXAMPLE 2

Example 2 was prepared in an essentially similar manner to Example 1, except 0.036 g-0.171 g of nanographene platelets N008-100-05 (N008) from Angstron Materials Inc. were used in place of N006. Through-plane electrical resistivity, using a two-electrode configuration, was measured and is given in Table 1, together with the relative amount of nanographene platelets, as a weight percent of the total weight of the substrate.

COMPARATIVE EXAMPLE 1

Comparative Example 1 was prepared in an essentially similar manner to Example 1, except instead of the addition of nanographene platelets, 0.033 g-0.152 g of additional graphite particles Timrex® E-LB 2001 from Timcal Graphite & Carbon were added. Through-plane electrical resistivity, using a two-electrode configuration, was measured and is given in Table 1, together with the relative amount of additional graphite particles Timrex® E-LB 2001, as a weight percent of the total weight of the substrate.

EXAMPLE 3

A 30 g/m² A4 sample of carbon fibre web (absolute weight of web=1.87 g) manufactured by Technical Fibre Products was impregnated with 1.71 g of fluorinated ethylene propylene (Dyneon™ FEP6300GZ from 3M), 4.50 g of graphite/carbon black particles (Timrex® LB-1016 from Timcal Graphite & Carbon), 1.54 g of carbon black particles (Timrex® RD696 from Timcal Graphite & Carbon) and varying weights (0.18 g-0.54 g), equating to from 1 to 4.5 wt % of the total weight of solids (FEP+graphite/carbon+graphite+nanographene platelets) of nanographene platelets (N008-100-05 (N008) from Angstron Materials Inc. Through-plane electrical resistivity, using a two-electrode configuration, was measured and is given in Table 1, together with the relative amount of nanographene platelets, as a weight percent of the total of the substrate.

COMPARATIVE EXAMPLE 2

Comparative Example 2 was prepared in an essentially similar manner to Example 3, except instead of the addition of nanographene platelets, 0.28 g-0.63 g of additional carbon black particles Timrex® RD696 from Timcal Graphite & Carbon were added. Through-plane electrical resistivity, using a two-electrode configuration, was measured and is given in Table 1, together with the relative amount of additional graphite particles Timrex® RD696, as a weight percent of the total weight of the substrate.

TABLE 1

Example 1

| Wt % N006 (as wt % of total solids) | Wt % N006 (as wt % of total substrate) | Z Plane Resistivity (mohm · m) |
|---|---|---|
| 0 | 0.00 | 19.1 |
| 1 | 0.87 | 19.9 |
| 2 | 1.75 | 12.8 |
| 3 | 2.55 | 12.7 |
| 4 | 3.30 | 15.5 |
| 5 | 4.20 | 15.6 |
| 10 | 7.9 | 12.8 |

Example 2

| Wt % N008 (as wt % of total solids) | Wt % N008 (as wt % of total substrate) | Z Plane Resistivity (mohm · m) |
|---|---|---|
| 0 | 0.00 | 19.1 |
| 1 | 0.88 | 18.8 |
| 2 | 1.73 | 15.0 |
| 3 | 2.52 | 12.6 |
| 4 | 3.28 | 12.8 |
| 5 | 4.21 | 11.3 |
| 10 | 8.0 | 10.0 |

Comparative Example 1

| Wt % Extra ELB2000 (as wt % of total solids) | Wt % Extra ELB2000 (as wt % of total substrate) | Z Plane Resistivity (mohm · m) |
|---|---|---|
| 0 | 0.00 | 19.1 |
| 1 | 0.81 | 17.7 |
| 2 | 1.54 | 20.3 |
| 3 | 2.23 | 19.9 |
| 4 | 3.10 | 19.0 |
| 5 | 3.75 | 22.6 |

Example 3

| Wt % N008 (as wt % of total solids) | Wt % N008 (as wt % of total substrate) | Z Plane Resistivity (mohm · m) |
|---|---|---|
| 0 | 0.00 | 11.55 |
| 1.5 | 1.31 | 11.83 |
| 3 | 2.58 | 11.85 |
| 3.5 | 3.00 | 10.86 |
| 4 | 3.41 | 10.20 |
| 4.5 | 3.79 | 10.77 |

Comparative Example 2

| Wt % Extra RD696 (as wt % of total solids) | Wt % Extra RD696 (as wt % of total substrate) | Z Plane Resistivity (mohm · m) |
|---|---|---|
| 0 | 0.00 | 11.55 |
| 1.5 | 1.95 | 11.95 |
| 3 | 3.15 | 14.73 |
| 3.5 | 3.66 | 13.41 |
| 4 | 4.15 | 13.72 |
| 4.5 | 4.53 | 15.47 |

It can be seen from Table 1 that the resistivity of Examples 1 and 2 decreases (and therefore the conductivity increases) as the wt % of the nanographene platelets (N006 and N008) is increased. This is in contrast to the Comparative Example where an increase in resistivity (and therefore reduction in conductivity) is seen with the addition of the extra graphite. Thus the addition of nanographene platelets improves the conductivity of the substrate when compared to similar addition of extra graphite particles. The reduction in the resistivity of Examples 1 and 2 compared to Comparative Example 1 can also be seen in FIG. 1. The reduction in the resistivity of Example 3 compared to Comparative Example 2 can also be seen in FIG. 2.

The invention claimed is:

1. A non-woven gas diffusion substrate, comprising:
   (i) a non-woven carbon fibre web;
   (ii) a carbon particulate material selected from the group consisting of carbon black, graphite and a mixture of carbon black and graphite; and
   (iii) a hydrophobic binder,
      wherein a weight ratio of carbon particulate material to hydrophobic binder is from 66:34 to 50:50,
      wherein the substrate does not contain a carbonaceous or graphitized residue of an organic resin binder, and
      wherein the non-woven gas diffusion substrate further comprises a conductive material which is a nanographene platelet having a x:y aspect ratio from 0.01 to 100, a x:z aspect ratio of at least 500 and a y:z aspect ratio of at least 500, and wherein the conductive material is present in the non-woven gas diffusion substrate in an amount of from 0.75 wt % to 10 wt % based on the total weight of the non-woven gas diffusion substrate.

2. The non-woven gas diffusion substrate according to claim 1, wherein the conductive material is a wafer-like structure having an x dimension of from 0.5 to 500 μm, and a y-dimension of from 0.5 to 500 μm.

3. The non-woven gas diffusion substrate according to claim 1, wherein there is a gradient of the carbon particulate material, hydrophobic binder and conductive materials across the thickness of the non-woven carbon fibre web.

4. A process for forming a non-woven gas diffusion substrate according to claim 1, comprising the steps of:
   a) forming a non-woven carbon fibre web or taking a pre-formed non-woven fibre web;
   b) preparing a suspension of carbon particulate material, hydrophobic binder and nanographene platelet;
   c) applying the suspension into the non-woven carbon fibre web;
   d) drying and firing the non-woven carbon fibre web at a temperature that does not exceed 400° C.

5. A gas diffusion electrode comprising a non-woven gas diffusion substrate according to claim 1 and an electrocatalyst layer present on the non-woven gas diffusion substrate.

6. A membrane electrode assembly comprising a non-woven gas diffusion substrate according to claim 1.

7. A membrane electrode assembly comprising a gas diffusion electrode according to claim 5.

8. The non-woven gas diffusion substrate according to claim 1, wherein the conductive material is a wafer-like structure having an x dimension of from 1 to 100 μm, and a y-dimension of from 1 to 100 μm.

9. The non-woven gas diffusion substrate according to claim 1, wherein the nanographene platlet is present in the non-woven gas diffusion substrate in an amount of from 1.25 wt % to 5 wt % based on the total weight of the non-woven gas diffusion substrate.

10. The non-woven gas diffusion substrate according to claim 1, wherein the non-woven carbon fibre web is formed from fibres having a diameter of 5 nm to 1 μm and a length of from 10 nm to 10 μm.

11. The non-woven gas diffusion substrate according to claim 1, wherein the non-woven carbon fibre web is formed from fibres having a diameter of 1 μm to 12 μm and a length of from 2 mm to 100 mm.

12. The non-woven gas diffusion substrate according to claim 1, wherein the non-woven carbon fibre web has a weight of 5-500 g/m$^2$.

13. The non-woven gas diffusion substrate according to claim 1, wherein the non-woven carbon fibre web has a weight of 10-50 g/m$^2$.

14. The non-woven gas diffusion substrate according to claim 1, wherein the hydrophobic binder is a fluoropolymer selected from polytetrafluoroethylene or fluorinated ethylene-propylene.

15. The non-woven gas diffusion substrate according to claim 1, wherein a concentration of the carbon particulate material, the hydrophobic binder and the nanographene platelet is non-homogeneous across a thickness of the non-woven carbon fibre web such that the concentration of the carbon particulate material, the hydrophobic binder and the conductive material is higher at two faces of the non-woven carbon fibre web with a lower concentration of the carbon particulate material, the hydrophobic binder and the nanographene platelet in a centre of the non-woven carbon fibre web.

* * * * *